(12) United States Patent
Chiu

(10) Patent No.: US 7,826,656 B2
(45) Date of Patent: Nov. 2, 2010

(54) METHOD FOR COMPENSATING PIXEL INTERFERENCE OF IMAGE

(75) Inventor: Shang-Kai Chiu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 959 days.

(21) Appl. No.: 11/624,519

(22) Filed: Jan. 18, 2007

(65) Prior Publication Data

US 2008/0063269 A1 Mar. 13, 2008

(30) Foreign Application Priority Data

Sep. 12, 2006 (TW) .............................. 95133604 A

(51) Int. Cl.
*G06K 9/00* (2006.01)
(52) U.S. Cl. ..................... 382/162; 382/167; 358/518
(58) Field of Classification Search ................ 382/167, 382/274; 348/234, 273
See application file for complete search history.

(56) References Cited

U.S. PATENT DOCUMENTS

| | | | | |
|---|---|---|---|---|
| 7,116,819 B2* | 10/2006 | Zhang | ......................... | 382/162 |
| 2003/0214594 A1 | 11/2003 | Bezryadin | .................... | 348/280 |
| 2006/0050159 A1 | 3/2006 | Ahn | ........................... | 348/272 |
| 2008/0158396 A1* | 7/2008 | Fainstain et al. | ............. | 348/246 |

FOREIGN PATENT DOCUMENTS

TW 1245547 11/2005

OTHER PUBLICATIONS

Weerasinghe et al: "Novel color processing architecture for digital cameras with CMOS image sensors", IEEE-CE, 2005.*
Wanqing Li et al., "CMOS Sensor Cross-Talk Compensation for Digital Cameras" IEEE Transactions on Consumer Electronics, vol. 48, No. 2, May 2002, pp. 292-297.
Chinese Examination Report of Taiwan Application No. 095133604, dated on Jul. 2, 2009.

* cited by examiner

*Primary Examiner*—Samir A. Ahmed
*Assistant Examiner*—Ruiping Li
(74) *Attorney, Agent, or Firm*—J.C. Patents

(57) ABSTRACT

A method for compensating a pixel of an image is provided The method includes using four median value extraction matrices to obtain the edge information of the image, where the edge information obtained by two of the matrices is Gb value, and the edge information obtained by the other two matrices is Gr value, calculating the corresponding average values of the Gb and Gr values, multiplying a differential value between the average value of the Gb value and the average value of the Gr value with a proportion value to obtain a compensation value, and adding the compensation value to or subtracting the compensation value from the original Gb and Gr values to obtain compensated Gb and Gr values.

10 Claims, 2 Drawing Sheets

| $G_1$ | R | $G_2$ | R | $G_3$ |
|---|---|---|---|---|
| B | $G_4$ | B | $G_5$ | B |
| $G_6$ | R | $G_7$ | R | $G_8$ |
| B | $G_9$ | B | $G_a$ | B |
| $G_b$ | R | $G_c$ | R | $G_d$ |

FIG. 3 (PRIOR ART)

| $G_{b00}$ | $B_{01}$ | $G_{b02}$ | $B_{03}$ | $G_{b04}$ |
|---|---|---|---|---|
| $R_{10}$ | $G_{r11}$ | $R_{12}$ | $G_{r13}$ | $R_{14}$ |
| $G_{b20}$ | $B_{21}$ | $G_{b22}$ | $B_{23}$ | $G_{b24}$ |
| $R_{30}$ | $G_{r31}$ | $R_{32}$ | $G_{r33}$ | $R_{34}$ |
| $G_{b40}$ | $B_{41}$ | $G_{b42}$ | $B_{43}$ | $G_{b44}$ |

FIG. 4

METHOD FOR COMPENSATING PIXEL INTERFERENCE OF IMAGE

CROSS-REFERENCE TO RELATED APPLICATION

This application claims the priority benefit of Taiwan application serial no. 95133604, filed on Sep. 12, 2006. All disclosure of the Taiwan application is incorporated herein by reference.

BACKGROUND OF THE INVENTION

1. Field of the Invention

The present invention relates to an image processing method. More particularly, the present invention relates to an image processing method for solving pixel interference of an image.

2. Description of Related Art

FIG. 1 is a block diagram of the circuit of a conventional image capturing device. Referring to FIG. 1, an image sensing module includes an image sensing device 10, an analog control circuit 11, and an analog-to-digital signal converter 12. An image signal processor includes an image sensing device compensator 13, a color interpolation device 14, and an image quality enhancing device 15. The image sensing device 10 includes a condensing lens 16, a color filter array 17, and a photo-diode 18. As each pixel corresponds to a color in the color filter array 17, the image sensing module will output Bayer array data 19.

Normally, image data can be the Bayer array data shown in FIG. 2. FIG. 2 is a 5×5 Bayer array data. Referring to FIG. 2, a red pixel R or a blue pixel B can be in a horizontal direction of a green pixel. If the red pixel R is in the horizontal direction of the green pixel, the green pixel is referred to as a Gr pixel. If the blue pixel B is in the horizontal direction of the green pixel, the green pixel is referred to as a Gb pixel. The pixel interference, such as optical coupling and electrical leakage of elements, will cause the difference of converted electrical signals when the same light is absorbed by the Gr or Gb pixels. Therefore, after the electrical signals pass through the color interpolation device 14, false color occurs.

In the conventional art, such as the interpolation method disclosed by W. Li et al. (W. Li, P. Ogunbona, Y. Shi, and I. Kharitonenko, "CMOS Sensor Cross-Talk Compensation for Digital Cameras", IEEE Trans. on Consumer Electronics, Vol. 48, No. 2, pp. 292-297, May 2002), $G_7$ pixel in the Bayer array data shown in FIG. 3 is regarded as a Gr pixel to be compensated, and the compensated $G_7^{new}$ is calculated according to the formulae below.

$$G^{new}_7 = G_7 + \Delta G$$

where $$\Delta G_7 = (\Delta G_4 + \Delta G_5 + \Delta G_9 + \Delta G_a)/4$$

$$\Delta G_4 = G_4 - (G_1 + G_2 + G_6 + G_7)/4$$

$$\Delta G_5 = G_5 - (G_2 + G_3 + G_7 + G_8)/4$$

$$\Delta G_9 = G_9 - (G_6 + G_7 + G_b + G_c)/4$$

$$\Delta G_a = G_a - (G_7 + G_8 + G_c + G_d)/4$$

According to the above formulae, it is known that the compensation value is an average value of four surrounding Gb differential values, where each Gb differential value is obtained by subtracting the average value of four surrounding Gr values. As this method captures a great quantity of surrounding pixels to calculate the average values, when tiny line structures fall in the region, false color occurs around the lines and on the lines. Meanwhile, this method compensates one of the Gr or Gb pixels only, which makes the entire compensated image tend to be bluish or reddish. Moreover, W. Li et al. disclosed a second average value method in the same paper. Though the Gb and Gr pixels are compensated at the same time, this average value method still captures a great quantity of surrounding pixels to calculate the average values, and causes false color in tiny structures as well.

In addition, the interpolation method disclosed by C. Weerasinghe et al. (C. Weerasinghe, I. Kharitonenko, and P. Ogunbona, "Method of Color Interpolation in a Single Sensor Color Camera Using Green Channel Separation", IEEE Proceeding 2002, pp. 3233-3236, 2002) regards a $G_7$ pixel 30 in Bayer array data shown in FIG. 3 as a Gr pixel to be compensated, and the compensated $G_7^{new}$ is calculated according to the formula below.

$$G_7^{new} = \frac{G_7 + SMF(G_4, G_5, G_9, G_a, G_7)}{2}$$

where, SMF (standard median filter) stands for a median value extraction filter. Therefore, a compensation value is obtained by extracting the median value of the $G_7$ and the four surrounding Gb, and then the $G_7^{new}$ is an average value of the median value and the $G_7$. This method often extracts wrong median for tiny line structures, thus causing false color in the tiny line structures as well.

SUMMARY OF THE INVENTION

The present invention is directed to a method for compensating image array data, which effectively solves the problems concerning color deviation of images and false colors on tiny line structures or edges thereof. The image array data comprises a plurality of color pixels, and the color pixels at least comprise a plurality of first color pixels.

The method for compensating image array signals provided by the present invention comprises the following steps. One of the first color pixels is selected for further compensation. The color pixels horizontally adjacent to the selected first color pixel are second color pixels, and the color pixels vertically adjacent to the selected first color pixel are third color pixels. In addition, the first color pixels horizontally adjacent to the second color pixels in a predetermined region around the selected first color pixel are operated to obtain a first average value. Similarly, the first color pixels horizontally adjacent to the third color pixels in the predetermined region are operated to obtain a second average value. Thus, the present invention obtains a compensation value according to the first average value and the second average value, so as to compensate the selected first color pixel.

In order to make the aforementioned and other objects, features and advantages of the present invention comprehensible, preferred embodiments accompanied with figures are described in detail below.

BRIEF DESCRIPTION OF THE DRAWINGS

FIG. 3 is a schematic view of the conventional compensation technique to image array data.

FIG. 4 is a schematic view of a 5×5 Bayer array data according to a preferred embodiment of the present invention.

DESCRIPTION OF EMBODIMENTS

Figures 1, 2:
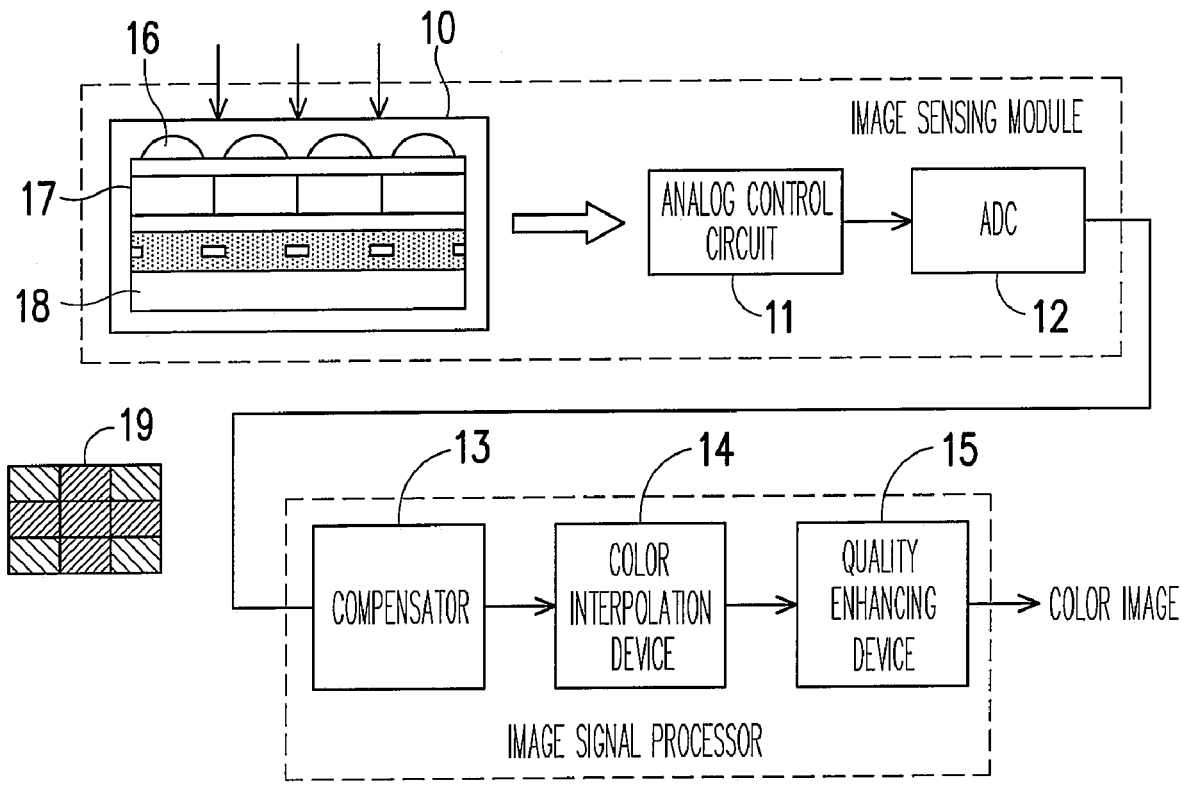
FIG. 1 is a block diagram of the circuit of a conventional image capturing device.
FIG. 2 is a schematic view of a 5×5 Bayer array data.

FIG. 4 is a 5×5 Bayer array data 40. Referring to FIG. 4, the present invention uses four standard median filters to obtain tiny components $\beta_1$, $\beta_2$, $\beta_3$, and $\beta_4$, which are obtained by the following formulas.

$\beta_1 = SMF(Gb_{02}, Gb_{20}, Gb_{22}, Gb_{24}, Gb_{42})$ $\beta_2 = SMF(Gb_{00}, Gb_{04}, Gb_{22}, Gb_{40}, Gb_{44})$ $\beta_3 = SMF(Gr_{11}, Gr_{13}, Gr_{33})$ $\beta_4 = SMF(Gr_{11}, Gr_{31}, Gr_{33})$ Here, SMF refers to the operation of extracting the median value. Assuming $Gb_{02} > Gb_{20} > Gb_{22} > Gb_{24} > Gb_{42}$, the output of the standard median filter is $Gb_{22}$. Similarly, persons of ordinary skill in the art can sequentially determine the values of $\beta_2$, $\beta_3$, and $\beta_4$. $\beta_1$ and $\beta_2$ reveal the edge information of the Gb pixels in this embodiment. On the other hand $\beta_3$ and $\beta_4$ reveal the edge information of the Gr pixels in this embodiment. Through the filter element distribution of the four standard median filters, the components of the tiny line structures falling in the Gb and Gr pixels are obtained respectively. Regardless whether the line structures in this embodiment are straight lines, oblique lines, right angles, V-shaped lines, or any other polygons, the tiny components of the Gb and Gr pixels can be obtained using the four standard median filters.

Then, the average value of $\beta_1$ and $\beta_2$ of the Gb pixels is obtained, i.e., the average value of the tiny structures in the Gb pixels is obtained, which is represented by $d_1$ as follows.

$$d_1 = \frac{(\beta_1 + \beta_2)}{2}$$

similarly, the average value of $\beta_3$ and $\beta_4$ of the Gr pixels is obtained, i.e., the average value of the tiny structures in the Gr pixels is obtained, which is represented by $d_2$ as follows.

$$d_2 = \frac{(\beta_3 + \beta_4)}{2}$$

Then the compensated $Gb_{22}$ is calculated according to the formula below.

$Gb_{22}^{new} = Gb_{22} + (d_2 - d_1)/2$

The components of each of the compensated Gb and Gr pixels can be obtained by repeating the above steps.

To sum up, the method of the present invention compensates the interference of the pixels of the image sensor in the regions with uniform and smooth colors, on the tiny line structures and on the edges thereof, so as to suppress the occurrence of the false colors.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for compensating image array data, the image array data comprising a plurality of color pixels, and the color pixels at least comprising a plurality of first color pixels, the method for compensating comprising:

selecting one of the first color pixels for compensation, wherein the color pixels horizontally adjacent to the selected color pixel are second color pixels, and the color pixels vertically adjacent to the selected color pixel are third color pixels, wherein the selected first color pixel is defined as $A_{ij}$, and i represents a row number and j represents a column number, and i and j are positive integers;

operating the first color pixels horizontally adjacent to the second color pixel in a predetermined region around the selected first color pixel, so as to obtain a first average value, wherein the steps of obtaining the first average value comprising:

capturing and comparing a first plurality of the first color pixels comprising five pixels $A_{(i-2)j}$, $A_{i(j-2)}$, $A_{ij}$, $A_{i(j+2)}$ and $A_{(i+2)j}$ to obtain a first median value;

capturing and comparing a second plurality of the first color pixels comprising five pixels $A_{(i-2)(j-2)}$, $A_{(i-2)(j+2)}$, $A_{ij}$, $A_{(i+2)(j-2)}$ and $A_{(i+2)(j+2)}$ to obtain a second median value; and obtaining an average of the first median value and the second median value as the first average value;

operating the first color pixels horizontally adjacent to the third color pixel in the predetermined region, so as to obtain a second average value; and obtaining a compensation value according to the first average value and the second average value, so as to compensate the selected first color pixel.

2. The method for compensating image array data as claimed in claim 1, further comprising multiplying a differential value between the second average and the first average value with a proportion value to obtain the compensation value.

3. The method for compensating image array data as claimed in claim 1, further comprising adding the compensation value to the original $A_{ij}$ value to obtain a new $A_{ij}$ value.

4. The method for compensating image array data as claimed in claim 1, wherein the first color pixels are green pixels.

5. The method for compensating image array data as claimed in claim 1, wherein one of the second color pixels and the third color pixels are red pixels, and the other are blue pixels.

6. A method for compensating image array data, the image array data comprising a plurality of color pixels, and the color pixels at least comprising a plurality of first color pixels, the method for compensating comprising:

selecting one of the first color pixels for compensation, wherein the color pixels horizontally adjacent to the selected color pixel are second color pixels, and the color pixels vertically adjacent to the selected color pixel are third color pixels, wherein the selected first color pixel is defined as $A_{ij}$, and i represents a row number and j represents a column number, and i and j are positive integers;

operating the first color pixels horizontally adjacent to the second color pixel in a predetermined region around the selected first color pixel, so as to obtain a first average value;

operating the first color pixels horizontally adjacent to the third color pixel in the predetermined region, so as to obtain a second average value; and obtaining a compensation value according to the first average value and the second average value, so as to compensate the selected first color pixel, wherein the steps of obtaining the second average value comprising:

capturing and comparing a first plurality of the first color pixels comprising three pixels $A_{(i-1)(j-1)}$, $A_{(i-1)(j+1)}$ and $A_{(i+1)(j+1)}$ to obtain a third median value;

capturing and comparing a second plurality of the first color pixels comprising three pixels $A_{(i-1)(j-1)}$, $A_{(i-1)(j-1)}$ and $A_{(i+1)(j+1)}$ to obtain a fourth median value; and obtaining an average of the third median value and the fourth median value as the second average value.

7. The method for compensating image array data as claimed in claim 6, further comprising multiplying a differential value between the second average and the first average value with a proportion value to obtain the compensation value.

8. The method for compensating image array data as claimed in claim 6, further comprising adding the compensation value to the original $A_{ij}$ value to obtain a new $A_{ij}$ value.

9. The method for compensating image array data as claimed in claim 6, wherein the first color pixels are green pixels.

10. The method for compensating image array data as claimed in claim 6, wherein one of the second color pixels and the third color pixels are red pixels, and the other are blue pixels.

* * * * *